United States Patent
Bastien

(10) Patent No.: US 11,954,034 B2
(45) Date of Patent: Apr. 9, 2024

(54) CACHE COHERENCY PROTOCOL FOR ENCODING A CACHE LINE WITH A DOMAIN SHARED STATE

(71) Applicant: WOVEN BY TOYOTA, INC., Tokyo (JP)

(72) Inventor: Jean-Francois Bastien, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 95 days.

(21) Appl. No.: 17/705,450

(22) Filed: Mar. 28, 2022

(65) Prior Publication Data

US 2023/0305961 A1    Sep. 28, 2023

(51) Int. Cl.
*G06F 12/0817*    (2016.01)

(52) U.S. Cl.
CPC .... *G06F 12/0828* (2013.01); *G06F 2212/621* (2013.01)

(58) Field of Classification Search
CPC ........................ G06F 12/0828; G06F 2212/621
See application file for complete search history.

(56) References Cited

U.S. PATENT DOCUMENTS

| | | | |
|---|---|---|---|
| 5,522,058 A | 5/1996 | Iwasa et al. | |
| 5,752,258 A | 5/1998 | Guzovskiy et al. | |
| 5,787,478 A * | 7/1998 | Hicks | G06F 12/0811 |
| | | | 711/E12.024 |
| 9,812,221 B1 * | 11/2017 | Hagen | G06F 12/1027 |
| 2008/0222111 A1 * | 9/2008 | Hoang | G06F 16/21 |
| 2012/0210071 A1 * | 8/2012 | Black | G06F 12/084 |
| | | | 711/E12.065 |
| 2017/0371786 A1 | 12/2017 | Srinivasan et al. | |

FOREIGN PATENT DOCUMENTS

| JP | H06110844 A | 4/1994 |
|---|---|---|
| JP | 2021-077023 A | 5/2021 |

\* cited by examiner

*Primary Examiner* — Baboucarr Faal
(74) *Attorney, Agent, or Firm* — Sughrue Mion, PLLC

(57) ABSTRACT

A system, method, and storage medium are provided. The system includes a real-time domain including a real-time cache and a non-real-time domain including a non-real-time cache. The system is configured to implement a cache coherency protocol by indicating that a cache line may be shared between the real-time cache and the non-real-time cache.

11 Claims, 4 Drawing Sheets

CACHE COHERENCY PROTOCOL FOR ENCODING A CACHE LINE WITH A DOMAIN SHARED STATE

BACKGROUND

1. Field

The disclosure relates generally to cache coherency in a processing system.

2. Description of Related Art

Functional-safety critical hardware, such as vehicle hardware, may be more cost-effective and perform better if less hardware were required. However, current hardware relies on speculation, caches, and other mechanisms to provide high performance. This makes it difficult to execute functional-safety critical code on the same hardware as non-functional-safety critical code, as it causes code with different reliability goals to interfere with each other.

Current hardware configurations have non-architectural resources which are shared. Sharing these resources, however, is generally undesirable because applications need to guarantee coherence and Freedom From Interference (FFI). FFI in the context of automotive software typically requires that a fault in a less safety critical domain (e.g., with a lower Automotive Safety Integrity Level (ASIL)) not interfere with or lead to a fault in a more safety critical domain (e.g., with a higher ASIL). For example, software of the low ASIL component may use more resources (e.g., memory, execution time, etc.) than expected, and cause higher ASIL components to run out of resources. In context, shared resources such as data caches may cause interference because accessing memory from a low ASIL component may evict cache entries from a high ASIL component. FFI is therefore an important aspect in functional safety critical hardware systems to prevent such faults. To this end, FFI has led to hardware design in which no resources are shared at all between application domains.

SUMMARY

In accordance with an aspect of the disclosure, a system may include a real-time domain including a real-time cache and a non-real-time domain including a non-real-time cache. The system may be configured to implement a cache coherency protocol by indicating that a cache line may be shared between the real-time cache and the non-real-time cache.

In accordance with an aspect of the disclosure, a method may include providing a real-time domain including a real-time cache, providing a non-real-time domain including a non-real-time cache and implementing a cache coherency protocol by indicating that a cache line may be shared between the real-time cache and the non-real-time cache.

In accordance with an aspect of the disclosure, a non-transitory computer-readable storage medium may store instructions that, when executed by at least one processor, cause the at least one processor to implement a cache coherency protocol by indicating that a cache line may be shared between a real-time cache of a real-time domain and a non-real-time cache of a non-real-time domain.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
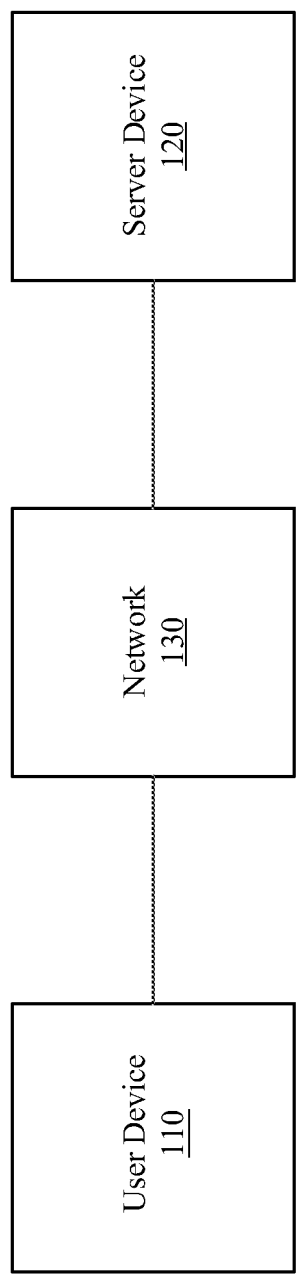
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), a device for controlling one or more components of a vehicle, safety critical devices, such as medical devices, robotic devices, vehicles, drones, etc., or a similar device.

The server device 120 includes one or more computing devices accessible via a network 130 (such as the Internet).

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a telematics network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
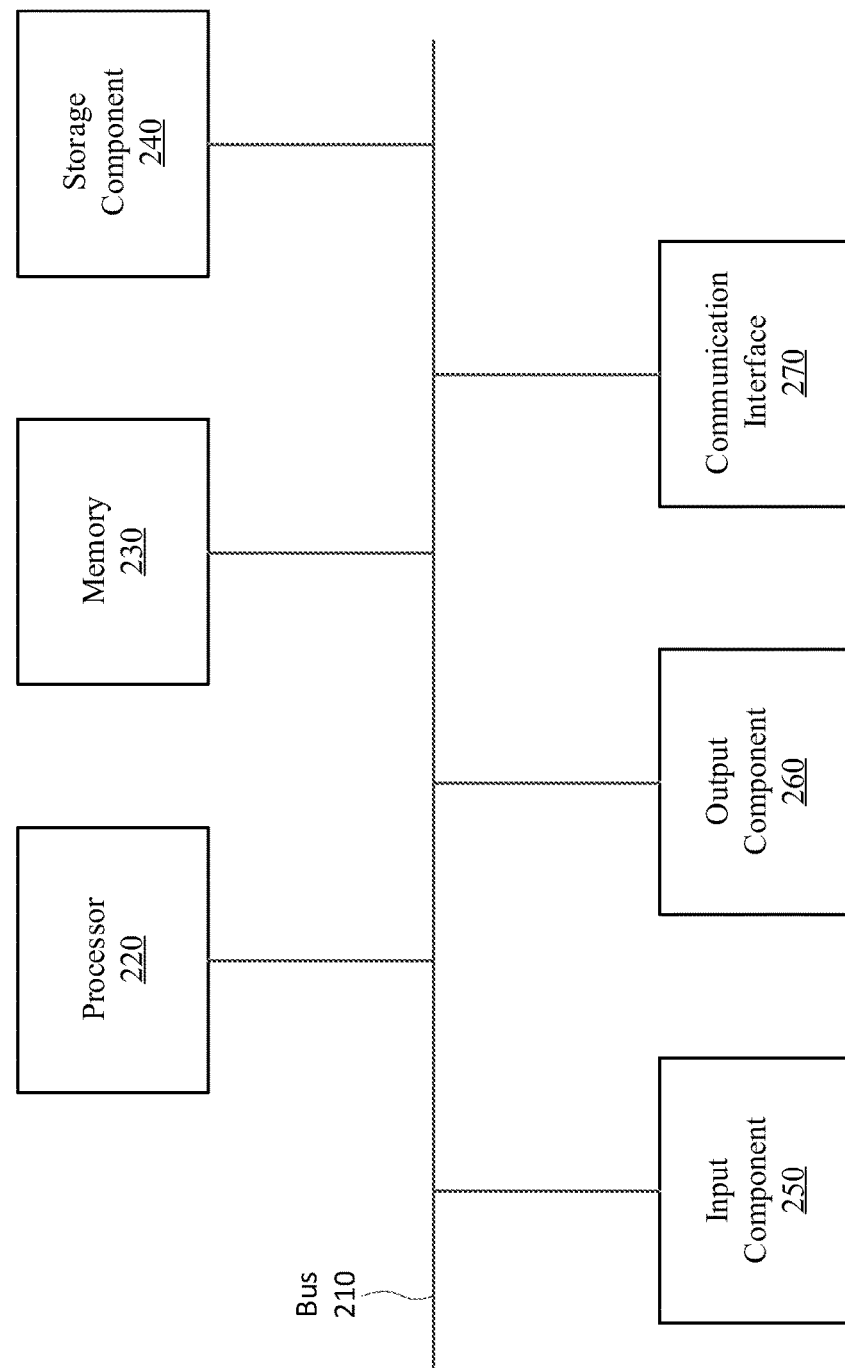
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 may be at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a processing core, or another type of processing component. The processor 220 includes one or more processors capable of being programmed to perform a function.

The memory 230 includes a random access memory (RAM), a read only memory (ROM), caches, instruction caches, a Translation Lookaside Buffer (TLB), branch predictions, and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

A processor, such as a Graphical Processing Unit (GPU), may utilize a unified memory and work with an Operating System (OS) kernel (e.g., a LINUX kernel) to perform cache coherency and handle related functions (e.g., TLB misses) between the processor and a central processing unit (CPU) at that level.

Care must be taken in managing shared resources such as caches between different application domains to ensure Freedom From Interference (FFI). When a particular domain maintains a cache of a common memory resource, problems may arise with incoherent data. For example, an update to the data in the domain's local cache may not be reflected in the common memory resource or another domain's local cache. To this end, cache coherency protocols are designed and implemented to ensure uniformity of shared resource data stored in multiple local or domain caches. In accordance with an embodiment, a real-time host Operating System (OS), or thin hypervisor supervisor, may manage guest OSes in virtual CPUs, some in real-time and some in non-real-time. For example, virtual CPUs may be allocated to different domains to assist in isolating them while they perceive to own an actual CPU.

Disclosed herein is a hardware design that allows for software to express where an interference is acceptable between domains. The disclosed hardware design permits the hardware to perform well with typical speculation and caching within each domain. The disclosed hardware design also restricts interference to shared resources which the software identifies as explicitly shared. As a result, FFI is attained for shared resources, including those shared by safety critical domains and high level ASIL components.

Figure 3:
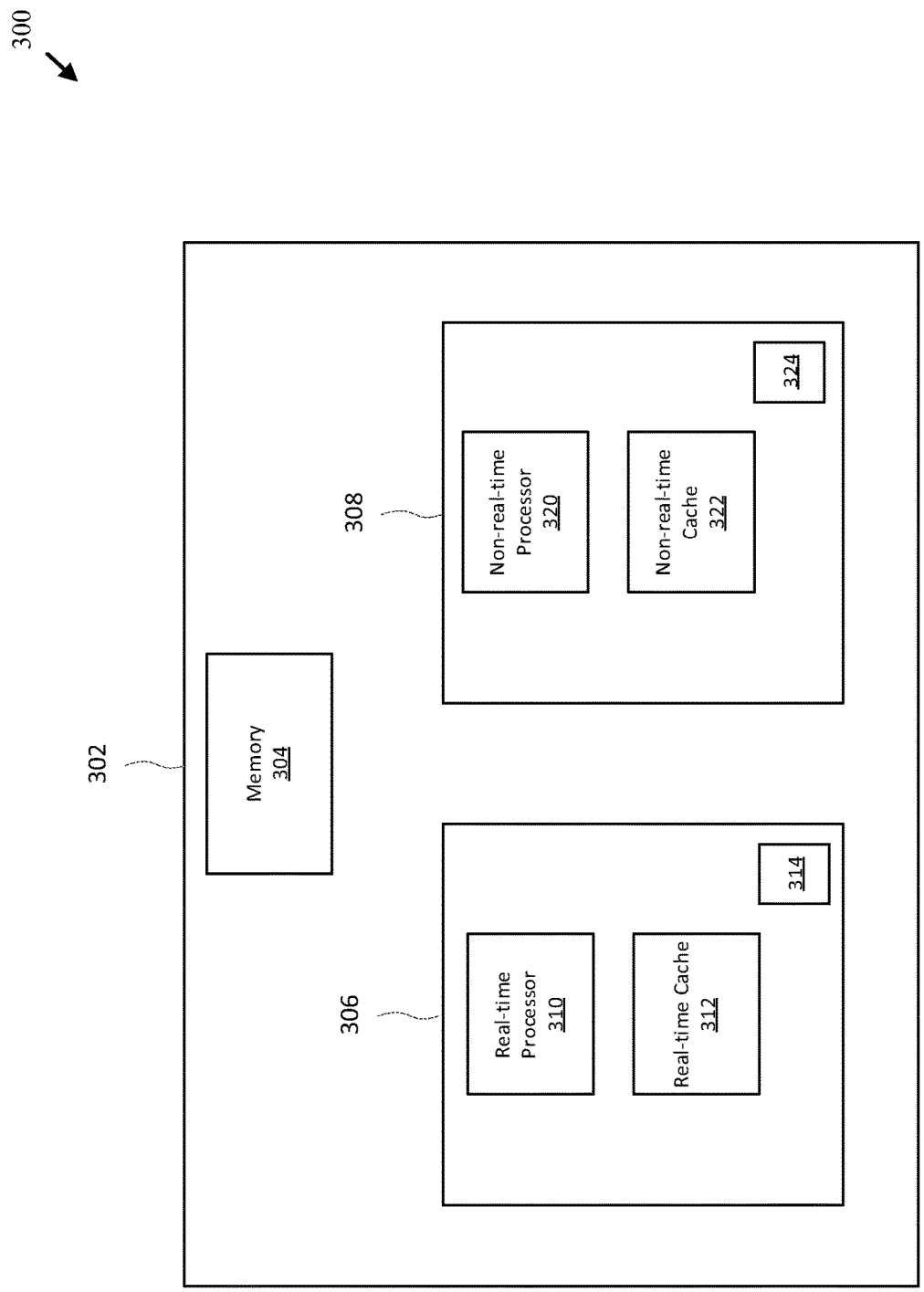
FIG. 3 is a diagram of a system that implements a cache coherency protocol, according to an embodiment.

FIG. 3 is a diagram of a system 300 that implements a cache coherency protocol, according to an embodiment. The system 300 may be implemented in a vehicle, an Internet of Things (IoT) environment, a cloud computing environment, or a combination thereof. The system 300 may be implemented as a system on a chip (SoC) within a computing device (e.g., either device 110 or 120 of FIG. 1 or the device 200 of FIG. 2).

The system 300 includes a memory 304, a real-time domain 306 and a non-real-time domain 308. The real-time domain includes a real-time processor 310 and a real-time cache 312 corresponding to the real-time processor 310. The real-time cache 312 may be implemented as part of the memory 304 or another memory designated to the real-time domain 306 (i.e., an additional memory storage in the real-time domain 306 or a partition of the memory 304 designated to the real-time domain 306). The real-time cache 312 includes a real-time cache line status indicator 314.

The non-real-time domain 308 domain includes a non-real-time processor 320 and a non-real-time cache 322 corresponding to the non-real-time processor 308. The non-real-time cache 322 may be implemented as part of the memory 304 or another memory designated to the non-real-time domain 308 (i.e., an additional memory storage in the non-real-time domain 308 or a partition of the memory 304 designated to the non-real-time domain 308). The non-real-time cache 322 includes a non-real-time cache line status indicator 324.

Although one real-time processor 310, one real-time cache 312, one non-real-time processor 320 and non-real-time cache 322 are depicted, it is understood that embodiments are not limited thereto, and multiple processors and/or multiple caches in either domain (real-time vs. non-real-time). Furthermore, the real-time processor 310 may include, for example, a CPU, and the non-real-time processor 320 may include an Arm A profile core. Each domain may have its own FFI requirement. For example, the real-time domain 306 may have a real-time FFI requirement, and the non-real-time domain 308 may have a non-real-time FFI requirement.

The real-time processor 310 may be configured to execute safety-related functions of a vehicle, such as collision avoidance, speed control, advanced driver-assistance systems (ADAS), automated driving, etc. The non-real-time processor 320 may be configured to execute non-safety related functions, such as vehicle temperature, infotainment, etc. It is understood that embodiments are not limited to the aforementioned examples of safety-related functions and non-safety related functions, and other safety related functions and non-safety related functions may be executed. The real-time domain 306 and the non-real-time domain 308 may access the memory 304, but otherwise may not communicate through cache coherency.

The system 300 may be configured to implement a cache coherency protocol for maintaining coherency between the real-time cache 312 and the non-real-time cache 322. The system 300 may implement the cache coherency protocol by indicating that a cache line may be shared between the real-time cache 312 and the non-real-time cache 322. The system 300 may indicate the cache line may be shared by encoding the cache line with a domain shared state. The system 300 may encode the cache line with the domain shared state by encoding the real-time cache line status indicator 314 and/or the non-real-time cache line status indicator 324 to indicate the domain shared state of the respective cache. For example, the system 300 may implement a page table which denotes information about bits with a page table entry. The page table entry may provide information about the entry, such as process ownership, on which OS the entry operates, entry type (writable, readable, executable, etc.). Thus, the page table entry may include a bit that indicates whether the entry may be shared between domains. It is understood that a page table is just one example of a mechanism by which the system 300 may indicate that a cache line may be shared, and one or more other exemplary embodiments are not limited thereto. For example, in various embodiments, any mechanism by which information indicating a domain shared state, i.e., whether or not a cache line is shareable, is maintained may be used.

The domain shared state identifies that the cache line may be shared between the real-time cache 312 and the non-real-time cache 322. The system may encode the indicators 314 and 324 by setting a bit value to 0 or 1 or another value that indicates the domain shared state. Thus, the cache line may be communicated between the real-time domain 306 and the non-real-time domain 308 (i.e., between the safety-related functions and the non-safety related functions). Therefore, the system 300 allows for FFI between the real-time domain 306 and the non-real-time domain 308, because the real-time cache 312 does not receive cache coherency traffic from domain shared caches and the non-real-time cache 322.

Figure 4:
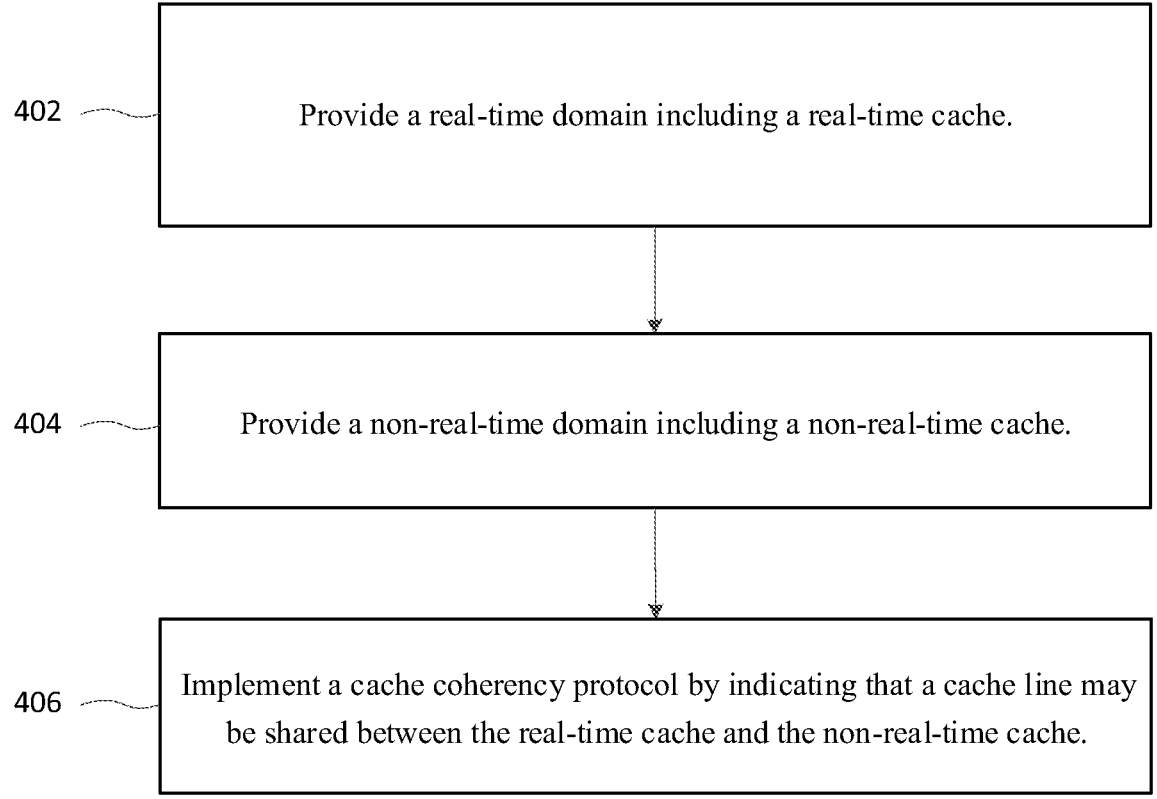
FIG. 4 is a flowchart of a method for implementing a cache coherency protocol, according to an embodiment.

FIG. 4 is a flowchart of a method for implementing a cache coherency protocol, according to an embodiment. In operation 402, the system is provided with a real-time domain including a real-time cache. In operation 404, the system is provided with a non-real-time domain including a non-real-time cache. In operation 406, the system implements a cache coherency protocol by indicating that a cache line may be shared between the real-time cache and the non-real-time cache. As a result, FFI between domains is ensured, because the real-time caches do not receive cache coherency traffic from the domain-shared and the non-real-time caches.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a real-time domain including a real-time cache configured to execute safety-related functions of a vehicle based on a real-time freedom from interference (FFI) requirement; and
   a non-real-time domain including a non-real-time cache configured to execute non-safety related functions of the vehicle based on a non-real-time FFI requirement, wherein the system is configured to implement a cache coherency protocol by:
      indicating that a cache line is sharable between the real-time cache and the non-real-time cache; and encoding the cache line with a domain shared state that indicates that the cache line may be shared between the real-time cache and the non-real-time cache, wherein the system is configured to encode the cache line with the domain shared state by setting a first cache line status indicator of the real-time domain to a first bit value corresponding to the domain shared state and a second cache line status indicator of the non-real-time domain to a second bit value corresponding to the domain shared state, wherein the first cache line status indicator is provided in the real-time cache, wherein the second cache line status indicator is provided in the non-real-time cache, and wherein, based on the first bit value and the second bit value indicating that the cache line is sharable between the real-time cache and the non-real-time cache, the cache line is communicated between safety-related functions and non-safety related functions, and the real-time cache is prevented from receiving cache coherency traffic from domain shared caches and the non-real-time cache.

2. The system of claim 1, wherein the real-time domain includes a real-time processor, and the non-real-time domain includes a non-real-time processor.

3. The system of claim 2, wherein the real-time processor executes safety-related functions, and the non-real-time processor executes non-safety related functions.

4. The system of claim 1, wherein the system is implemented on a vehicle, in an Internet of Things (IoT) environment, or a cloud computing environment.

5. A method, comprising:
providing a real-time domain including a real-time cache configured to execute safety-related functions of a vehicle based on a real-time freedom from interference (FFI) requirement;
providing a non-real-time domain including a non-real-time cache configured to execute non-safety related functions of the vehicle based on a non-real-time FFI requirement; and
implementing a cache coherency protocol by:
indicating that a cache line is sharable between the real-time cache and the non-real-time cache, and
encoding the cache line with a domain shared state that indicates that the cache line may be shared between the real-time cache and the non-real-time cache,
wherein encoding the cache line with the domain shared state comprises:
setting a first cache line status indicator of the real-time domain to a first bit value corresponding to the domain shared state; and
setting a second cache line status indicator of the non-real-time domain to a second bit value corresponding to the domain shared state,
wherein the first cache line status indicator is provided in the real-time cache,
wherein the second cache line status indicator is provided in the non-real-time cache, and
wherein, based on the first bit value and the second bit value indicating that the cache line is sharable between the real-time cache and the non-real-time cache, the cache line is communicated between safety-related functions and non-safety related functions, and the real-time cache is prevented from receiving cache coherency traffic from domain shared caches and the non-real-time cache.

6. The method of claim 5, wherein the real-time domain includes a real-time processor, and the non-real-time domain includes a non-real-time processor.

7. The method of claim 6, wherein the real-time processor executes safety-related functions, and the non-real-time processor executes non-safety related functions.

8. The method of claim 5, wherein the method is implemented on a vehicle, in an Internet of Things (IoT) environment, or a cloud computing environment.

9. A non-transitory computer-readable storage medium storing instructions that, when executed by at least one processor, cause the at least one processor to implement a cache coherency protocol by:
indicating that a cache line is sharable between a real-time cache of a real-time domain and a non-real-time cache of a non-real-time domain, the real-time cache configured to execute safety-related functions of a vehicle based on a real-time freedom from interference (FFI) requirement, and the non-real-time cache configured to execute non-safety related functions of the vehicle based on a non-real-time FFI requirement; and
encoding the cache line with a domain shared state that indicates that the cache line may be shared between the real-time cache and the non-real-time cache,
wherein the instructions, when executed by the at least one processor, cause the at least one processor to encoding the cache line with the domain shared state by:
setting a first cache line status indicator of the real-time domain to a first bit value corresponding to the domain shared state; and
setting a second cache line status indicator of the non-real-time domain to a second bit value corresponding to the domain shared state,
wherein the first cache line status indicator is provided in the real-time cache,
wherein the second cache line status indicator is provided in the non-real-time cache, and
wherein, based on the first bit value and the second bit value indicating that the cache line is sharable between the real-time cache and the non-real-time cache, the cache line is communicated between safety-related functions and non-safety related functions, and the real-time cache is prevented from receiving cache coherency traffic from domain shared caches and the non-real-time cache.

10. The storage medium of claim 9, wherein the real-time domain includes a real-time processor, and the non-real-time domain includes a non-real-time processor.

11. The storage medium of claim 10, the real-time processor executes safety-related functions, and the non-real-time processor executes non-safety related functions.

* * * * *